United States Patent [19]

Furukawa et al.

[11] Patent Number: 4,680,240
[45] Date of Patent: Jul. 14, 1987

[54] METHOD FOR STARTING FUEL CELL POWER SYSTEMS

[75] Inventors: Nobuhiro Furukawa, Hirakata; Shuzo Murakami; Masato Nishioka, both of Ibaraki, all of Japan

[73] Assignee: Sanyo Electric Co., Ltd., Osaka, Japan

[21] Appl. No.: 886,497

[22] Filed: Jul. 17, 1986

[30] Foreign Application Priority Data

Jul. 19, 1985 [JP] Japan .................. 60-160701

[51] Int. Cl.$^4$ .............................................. H01M 8/04
[52] U.S. Cl. ........................................ 429/13; 429/26
[58] Field of Search .................... 429/13, 24, 25, 26, 429/22, 90, 17

[56] References Cited

U.S. PATENT DOCUMENTS 4,098,960 7/1978 Gagnon ........................... 429/23 X
4,182,795 1/1980 Baker et al. ...................... 429/13
4,192,906 3/1980 Maru ................................ 429/13
4,310,604 1/1982 Marchetti ..................... 429/13 X Primary Examiner—Anthony Skapars
Attorney, Agent, or Firm—Armstrong, Nikaido, Marmelstein & Kubovcik

[57] ABSTRACT

A method for starting fuel cell power systems comprises heating a fuel cell stack to a predetermined operating temperature with a circulating heat-exchanger fluid, while feeding a pressurized inert gas into a pressure vessel and process gas chambers of the fuel cell stack to increase pressures in the process gas chambers and pressure vessel to a predetermined pressure, detecting a temperature of the stack and a pressure of the inert gas in the process gas chambers, and controlling a vapor pressure in the inert gas fed to said chambers in proportion to the detected temperature and pressure in the process gas chambers so that a volume of an electrolyte is approximately kept constant.

1 Claim, 2 Drawing Figures

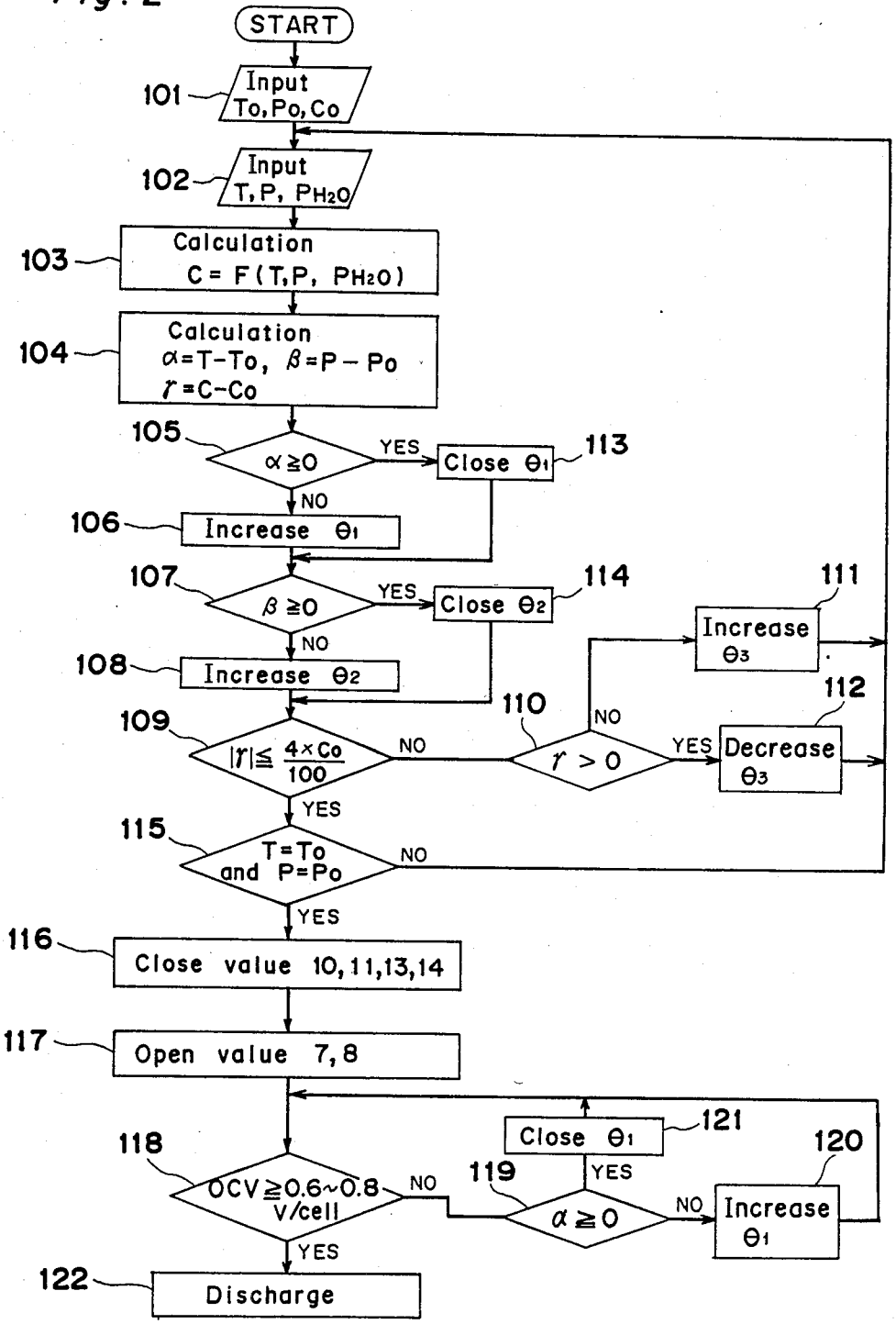

METHOD FOR STARTING FUEL CELL POWER SYSTEMS

FIELD OF THE INVENTION

This invention relates to a method for starting fuel cell power systems, in particular, to a method for starting pressurized fuel cell power generation systems of the kind wherein a fuel cell stack is housed in a pressure vessel and operated under pressure.

BACKGROUND OF THE INVENTION

In general, starting of a fuel cell power system is carried out by firstly heating a fuel cell stack to a temperature at which fuel cell reactions may take place, feeding process gases to the fuel cell stack, and then loading a direct current resistance to the output circuit of the fuel cell stack to heat the same with heat of fuel cell reactions to a predetermined operating temperature, or, its optimum operating temperature. At the predetermined operating temperature, the fuel cell stack generates its rating output power which is supplied to an external load. In pressurized fuel cell power systems of the kind, it is required to pressurize the process gases, cooling gas, and inert gas filled in the pressure vessel to the rating pressure after the fuel cell stack is heated to the predetermined temperature.

However, it is difficult with the conventional method of starting to properly control the operating conditions of the fuel cell stack during its starting process, since there are many variable parameters to be controlled such as, for example, a temperature of the fuel cell stack, pressures and supplies of the process gases, a vapor pressure in the process gases, a discharging current, and the like. If any mismatch of the variable parameters occurs during starting operation, the stack would be exposed to severe conditions, resulting in lowering in the life characteristics of the power system.

In particular, if a hygroscopic material, for example, phosphoric acid is used as the electrolyte, there may occur considerable variation in the volume of electrolyte in proportion to a vapor pressure in the process gases. If the volume of phosphoric acid electrolyte is increased considerably by absorption of water, the electrolyte would be leaked into gas diffusion layers (backing paper) and leaked out from the fuel cell stack, resulting in lowering of the characteristics. If the volume of the electrolyte is considerably decreased by evaporation, there may occur considerable increase in cell resistance and/or crossover of the process gases, resulting in deterioration of the characteristics. Accordingly it is very important to control the volume of the electrolyte to maintain a good performance of the fuel cell power system for a long period of time.

SUMMARY OF THE INVENTION

It is therefore an object of the present invention to provide a method for starting fuel cell power systems that makes it easy to properly control operating conditions of the fuel cell power system during starting.

Another object of the present invention is to provide a method for starting fuel cell power systems that makes it possible to prevent the fuel cell system from deterioration of characteristics.

According to the present invention, these and other objects are solved by providing a method for starting fuel cell power systems comprising heating a fuel cell stack to a predetermined operating temperature with a circulating heat-exchanger fluid, while feeding a pressurized inert gas into a pressure vessel and process gas chambers of the fuel cell stack to increase pressures in the process gas chambers and pressure vessel to a predetermined pressure, detecting a temperature of the stack and a pressure of the inert gas in the process gas chambers, and controlling a vapor pressure in the inert gas fed to said chambers in proportion to said detected temperature and pressure in the process gas chambers so that a volume of a hygroscopic electrolyte is approximately kept constant.

The present invention will be further apparent from the following description taken in conjunction of the accompanying drawings which show, by way of example only, one preferred embodiment thereof.

BRIEF DESCRIPTION OF THE DRAWINGS

FIG. 2 is a flow chart showing the sequence of operations of a control system embodying the present invention.

DETAILED DESCRIPTION OF THE PREFERRED EMBODIMENT

Figure 1:
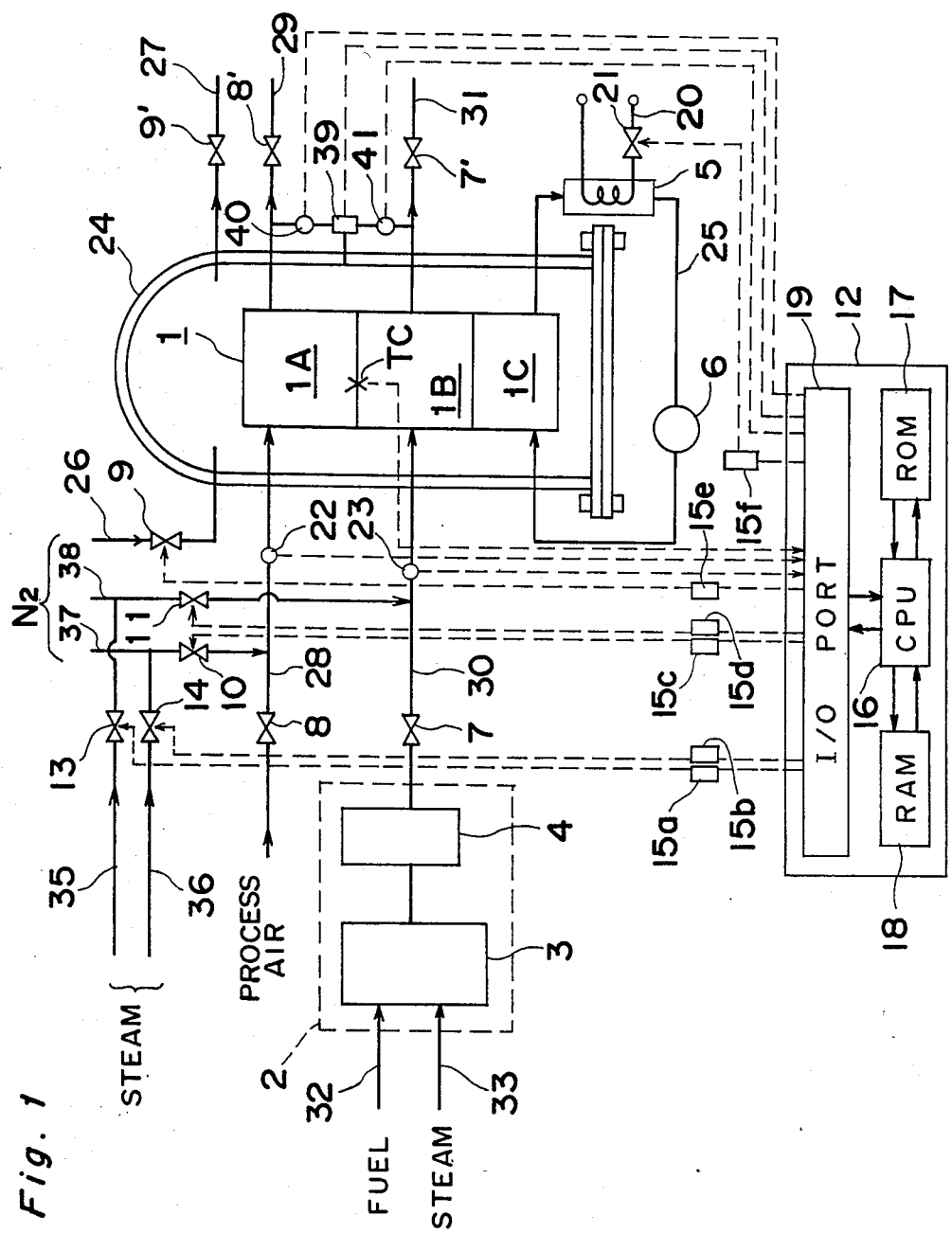
FIG. 1 is a schematic diagram of a fuel cell power system used for embodying a method of starting of the present invention.

Referring to FIG. 1, there is shown a phosphoric acid electrolyte fuel cell power system comprising a fuel cell stack 1 converting fuel to electric power, and a fuel processor 2 converting hydrocarbon fuel to a hydrogen-rich gas mixture.

The fuel cell stack 1 comprises individual fuel cells assembled into one or more fuel cell stacks together with cooling plates. Each individual fuel cell includes an electrolyte matrix sandwiched between two bipolar plates having process gas channels, that is, fuel gas channels and oxidant channels. The cooling plates have cooling gas channels and are arranged in the stack every several fuel cells. For simplification of the drawing, the fuel cell is schematically illustrated in FIG. 1 as being composed of a process air chamber 1A, a fuel gas chamber 1B, and a cooling gas channel 1C.

The stack 1 is housed in a pressure vessel 24 connected to an inert gas supply line 26 and an inert gas exhaust line 27, which are provided with a flow control valve 9 and a pressure control valve 9', respectively. The process air chamber 1A of the fuel cell stack is connected at its inlet to a process air supply line 28 provided with a flow control valve 8, and at its outlet to an exhaust line 29 provided with a pressure control valve 8'. The process air chamber 1A is also connected to an inert gas supply line 37 having a flow control valve 10 through the process air supply line 28. The inert gas supply line 37 is connected to a steam supply line 36 provided with a flow control valve 14. The fuel gas chamber 1B is connected at its inlet to the fuel processor 2 through a fuel gas supply line 30 with a flow control valve 7, and at its outlet to an exhaust gas line 31 provided with a pressure control valve 7'. The fuel gas chamber 1B is also connected to an inert gas supply line 38 with a flow control valve 11 through the fuel gas supply line 30, and to a steam supply line 35 with a flow control valve 13 through the inert gas supply line 38. The inert gas supply lines 26, 37, and 38 are connected to a source of inert gas such as, for example, a nitrogen gas bomb with reducing valves.

The cooling gas channel 1C is arranged in a heat-exchanger circuit which comprises a heat exchanger 5, a blower 6, and a circulating pipeline 25 for a heat-exchanger fluid. The heat exchanger 5 is connected to a pipeline 20 with a flow control valve 21, which in turn connected to a source of cooling medium such as water and to a source of heating medium such as steam via a directional control valve (not shown) arranged in the pipeline 20.

The fuel processor 2 includes a steam reformer 3 and a shift converter 4. Pressurized hydrocarbon fuel such as, for example, natural gas, methane gas and the like is fed through a pipeline 32 to the fuel processor 2 where the hydrocarbon fuel is reformed with steam supplied through a pipeline 33 under pressure to convert the same to a hydrogen-rich gas mixture. The hydrogen-rich gas mixture is passed through a condenser (not shown) to remove the most part of water vapor contained in the mixture, and then fed to the fuel gas chamber 1B as a fuel gas through the pipeline 30.

In steady state operation of the power system, the pressurized fuel gas fed to the fuel gas chamber 1B reacts with the pressurized process air fed to the process gas chamber 1A through the pipeline 28. Pressures in the respective chambers 1A and 1B are adjusted by controlling the valves 7, 7', 8, and 8'. The fuel cell stack 1 is maintained at its optimum operating temperature ranging from 180° to 190° C. by controlling the cooling gas, which is fed to the cooling gas channel 1C through the circulating line 25 by the blower 6, passed through the fuel cell stack 1 and then cooled by the heat exchanger 5.

The interior of the pressure vessel 24 is filled with a pressurized inert gas such as nitrogen gas to keep its internal pressure to the value equal to that of the process gas chambers 1A and 1B. The internal pressure of the pressure vessel 24 is adjusted by controlling opening angles of the valves 9 and 9'.

To control starting operations of the fuel cell power system, there is provided a programmable control system comprising a program controlled microprocessor 12 which includes a central processing unit (CPU) 16, a read-only memory (ROM) 17, a random-access memory (RAM) 18, and an input/output port (I/O port) 19. The control system further comprises digital-to-analog convertors (15a, 15b, 15c, 15d, 15e and 15f) electrically connected to the respective flow control valves 13, 14, 10, 11, 9, and 21, probably via driver circuits.

A temperature detector (TC) is mounted in the fuel cell stack to detect its temperature. The pressure vessel 24 is provided A with a pressure detector 39 to detect a pressure in the pressure vessel 24 and differential measuring devices 40 and 41 are connected to process gas chambers 1A and 1B and the pressure detector 39 to detect pressure difference between the chambers and the vessel. Humidity detectors 22 and 23 for detecting vapor pressures in the gases fed to the fuel cell stack 1 are arranged in the pipelines 28 and 30 respectively. These detectors are connected to the I/O port 19.

A temperature T of the stack 1 and the vapor pressure $P_{H_2O}$ are detected at short intervals, converted to electrical signals by the respective detectors TC, 22, 23 and stored in the RAM 18 through the I/O port 19 under the control of the CPU 16. Pressure P in the pressure vessel 24 is also detected by the pressure detector 39 at short intervals, converted to electrical signals and stored in the RAM 18 through the I/O port 19. Signals from the differential measuring devices 40 and 41 are also sent to the I/O part 19 and stored in the RAM 18. These data stored in the RAM 18 are renewed by the subsequent data.

According to the present invention, the starting of the pressurized fuel cell power system mentioned above is carried out in the following manner.

When the fuel cell power system is in stopping, the process gas chambers 1A and 1B are being filled with nitrogen gas and maintained at normal pressure as well as the internal pressure of the pressure vessel 24. All the valves are being held closed.

During the period in which the stack temperature T and chamber pressures P are raised gradually, the valves are controlled in the manner described below by the microprocessor 12, following a program stored in the ROM 17 and measured data stored in the RAM 18.

At the initial stage of the starting of the fuel cell power system, the valve 21 is firstly opened by the control system and steam is fed to the heat exchanger 5 through the pipeline 20 to heat the fuel cell stack 1 to the predetermined operating temperature $T_0$. At the same time, the valves 9, 10 and 11 are opened by the signals from the converters 15c, 15d and 15e to supply pressurized nitrogen gas (dry state) to the process gas chambers 1A and 1B and the pressure vessel 24 so that the pressures in the process gas chambers 1A and 1B and the pressure vessel are gradually increased to the predetermined operating pressure $P_0$. The pressure control valves 7', 8' and 9' are opened at a suitable opening angles, respectively.

As shown in FIG. 2, the predetermined operating temperature $T_0$, pressure $P_0$, and normal volume $C_0$ of phosphoric acid electrolyte are retrieved from the RAM 19 of the microprocessor 12 in a step 101, and then the above stored data T, P, and $P_{H_2O}$ are also retrieved from the RAM 18 in a step 102. The retrieved data are processed in steps 103 and 104 by the CPU 16 to determine the volume of the electrolyte and then a temperature difference $\alpha$ $(=T-T_0)$ between the measured value (T) and predetermined value $(T_0)$, a pressure difference $\beta (\beta = P - P_0)$ between the measured value (P) and predetermined value $(P_0)$, and a volume difference $\gamma$ $(=C-C_0)$.

If the temperature difference $\alpha$ is judged as being smaller than 0 in a step 105, an opening angle $\theta_1$ of the valve 21 is increased by an angle corresponding to the temperature difference $\alpha$, in a step 106, by the output signal of the CPU sent to the valve 21 through the DA converter 15f, and the program flow proceeds to a step 107. If the temperature difference $\alpha$ is judged as being equal to or greater than 0 in the step 105, the program flow shifts to a step 113 and the valve 21 is closed.

If the pressure difference $\beta$ is judged as being smaller than 0 in a step 107, signals are sent from the CPU 16 to the drive circuit for the valve 9 via the DA converter 15e to increase an opening angle $\theta_2$ of the valve 9 by an angle corresponding to the pressure difference in a step 108. In contrast therewith, if the pressure difference $\beta$ is judged as being equal to or greater than 0, the valve 9 is closed and the program flow shifts to a step 109. On the other hand, the valves 10 and 11 are so controlled by the control system that each pressure difference between the process gas chamber 1A or 1B and the interior of the pressure vessel 24 is kept 0.

In the step 109, the absolute value of the volume difference $\gamma$ of the electrolyte is compared with an allowable value which is set to a value ranging from $-4\%$ to $+4\%$ of the predetermined value $C_0$. If the absolute value of the volume difference is judged as being greater than the allowable value in the step 109, the program flow shifts to a step 110. If the volume difference is not greater than 0, the opening angles $\theta_3$, $\theta_3'$ of the valves 13, 14 are increased by an angle corresponding to the volume difference in a step 111 to increase the vapor pressure in the process gas chambers, and the program returns to the step 102. If the volume difference is greater than 0, the opening angles $\theta_3$, $\theta_3'$ are decreased by angles corresponding to the volume difference in step 112 to decrease the vapor pressure in the process gas chambers, and the the program returns to the step 102.

If the absolute value of the volume difference $\gamma$ is smaller than the above allowable value, the program flow proceeds to a step 115 where the measured values of the temperature and pressure, i.e., T and P are compared with the predetermined value $T_0$, $P_0$, respectively. If the measured values of the temperature and pressure are not equal to the predetermined values, the program returns to the step 102.

The above steps are repeated until the measured values of temperature and pressures become equal to the predetermined values and the volume difference of the electrolyte falls within a range of from $-4\%$ to $+4\%$ of the predetermined value $C_0$.

If the above conditions are fully satisfied during above steps, the program flow proceeds from the step 115 to a step 116 and the valves 10, 11, 13, 14 are closed. The valves 7 and 8 are then opened in a step 117 to feed pressurized process air and fuel gas to the fuel cell stack 1. In this case, some variation in pressure may occur, but this problem may be overcome by provision of a pressure difference control system or buffer tanks in the pipelines 28 and 30.

After beginning of process gas supplies, an output voltage on open circuit (OCV) of the fuel cell power system is sent to the I/O port 19 via a voltage divider (not shown) and compared with a predetermined value, $OCV_0$, which is generally set to a value ranging from 0.6 to 0.8 V/cell. If the open circuit voltage is less than $OCV_0$, the program flows to a step 119 where the temperature difference $\alpha$ is compared with the predetermined value 0. If $\alpha$ is not equal to or greater than 0, the opening angle $\theta_1$ of the valve 21 is increased by an angle corresponding to the temperature difference, and the program returns to the step 118. If $\alpha$ is equal to or greater than 0, the valve 21 is closed to stop heating of the fuel cell stack 1.

If the open circuit voltage OCV is judged in the step 118 as being higher than $OCV_0$, the program flow proceeds to a step 122. When the open circuit voltage OCV is reached to the rating voltage, the fuel cell power system begins its rating discharge. The pipeline 20 is then connected to the source of cooling medium by the directional control valve and the cooling medium is fed to the pipeline 20 through the valve 21 to maintain the fuel cell stack at its optimum operating temperature.

In the method of starting according to the present invention, the temperature of the fuel cell stack is not raised by the heat of fuel cell reactions under loading, so that the time required for starting of the power system is extended to about 3 hours. However, this causes no problem in practical applications since the time required for starting of the reformer is about 4 hours.

According to the present invention, the starting operation can be carried out without taking account of variable parameters such as process gas supplies, discharging current, and water produced by fuel cell reactions since no electricity is discharged from the power system. This makes it possible to keep the volume of the electrolyte constant with ease by adjusting the vapor pressure in the inert gas in proportion to the temperature and pressure of the fuel cell stack. It is therefore possible to prevent the fuel cell power system from deterioration.

What I claim is:

1. A method for starting fuel cell power systems comprising heating a fuel cell stack to a predetermined operating temperature with a circulating heat-exchanger fluid, while feeding a pressurized inert gas into a pressure vessel and process gas chambers of the fuel cell stack to increase pressures in the process gas chambers and pressure vessel to a predetermined pressure, detecting a temperature of the stack and a pressure of the inert gas in the process gas chambers, and controlling a vapor pressure in the inert gas fed to said chambers in proportion to said detected temperature and pressure in the process gas chambers so that a volume of a hygroscopic electrolyte is approximately kept constant.

* * * * *